US008880642B2

(12) United States Patent
Wang

(10) Patent No.: US 8,880,642 B2
(45) Date of Patent: Nov. 4, 2014

(54) SERVER RACK SYSTEM

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 390 days.

(21) Appl. No.: 13/396,103

(22) Filed: Feb. 14, 2012

(65) Prior Publication Data

US 2013/0138769 A1   May 30, 2013

(30) Foreign Application Priority Data

Nov. 28, 2011   (CN) .......................... 2011 1 0383725

(51) Int. Cl.
 *G06F 15/16* (2006.01)
(52) U.S. Cl.
 USPC ......................................................... 709/217
(58) Field of Classification Search
 USPC ......................................................... 709/217
 See application file for complete search history.

(56) References Cited

U.S. PATENT DOCUMENTS 5,845,149 A * 12/1998 Husted et al. ..................... 710/9

* cited by examiner

*Primary Examiner* — Tu Nguyen
(74) *Attorney, Agent, or Firm* — CKC & Partners Co., Ltd.

(57) ABSTRACT

A server rack system includes a communication module, multiple internal devices, and an integrated management module (IMM). The internal devices are coupled to the communication module. The IMM is coupled to the communication module and communicates with the internal devices through the communication module. The IMM is pre-stored with a correspondence relationship between marker information, identification information, and asset numbers of the internal devices. In operation of the system, the IMM reads the identification information of the internal devices through the communication module, and obtains a correspondence relationship between the marker information and asset numbers of the internal devices from the correspondence relationship according to the identification information to thereby perform asset management of the internal devices.

7 Claims, 2 Drawing Sheets

SERVER RACK SYSTEM

CROSS-REFERENCE TO RELATED APPLICATION

This application claims the priority benefit of China application serial no. 201110383725.X, filed on Nov. 28, 2011. The entirety of the above-mentioned patent application is hereby incorporated by reference herein and made a part of this specification.

BACKGROUND OF THE INVENTION

1. Field of the Invention

The present invention relates to a server, and more particularly, to a server rack system.

2. Description of Related Art

FIG. 1 is a block diagram illustrating a conventional server rack. A service network switch 120 and a plurality of servers 110-1 to 110-n are disposed in an interior of the conventional rack 100. The servers 110-1 to 110-n each have a service network port connected to the service network switch 120. The servers 110-1 to 110-n are connected to the internet 10 through the service network switch 120. Multiple servers 110-1 to 110-n and other devices are disposed inside the convention rack. Conventionally, the internal devices such as the multiple servers 110-1 to 110-n are manually managed, which is rather inconvenient and error prone.

SUMMARY OF THE INVENTION

Accordingly, the present invention is directed to a server rack system to address the problem that the conventional asset management is inconvenient and error prone.

One embodiment of the present invention provides a server rack system including a communication module, a plurality of internal devices in the rack, and an integrated management module (IMM). The internal devices are coupled to the communication module. The IMM is coupled to the communication module and communicates with the internal devices through the communication module. The IMM is pre-stored with a correspondence relationship between marker information, identification information, and asset numbers of the internal devices. In operation of the system, the IMM reads the identification information of the internal devices through the communication module, and obtains a correspondence relationship between the marker information and asset numbers of the internal devices from the correspondence relationship pre-stored in the IMM according to the identification information to thereby perform asset management of the internal devices.

In view of the foregoing, in the server rack system provided by the embodiment of the present invention, the internal devices within the rack system are management through the IMM. The IMM reads the identification information of the internal devices through the communication module and converts these identification information into corresponding asset numbers. The whole process is performed automatically without manual intervention, thus improving the efficiency and accuracy in asset management.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

The above mentioned internal devices within the rack include servers, fan units or power supply units. For example, in the present embodiment, the servers, fan units or at least one power supply unit are disposed within the rack.

Figure 1:
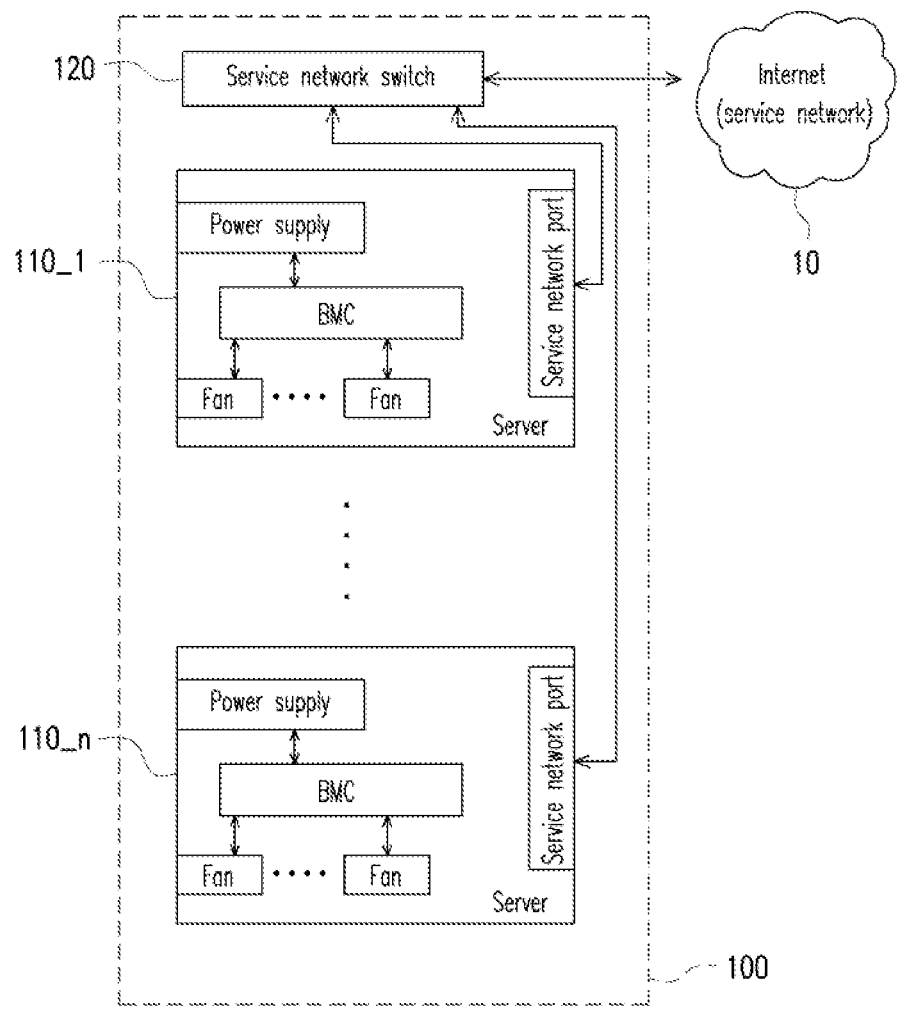
FIG. 1 is a block diagram illustrating a conventional server rack.
Figure 2:
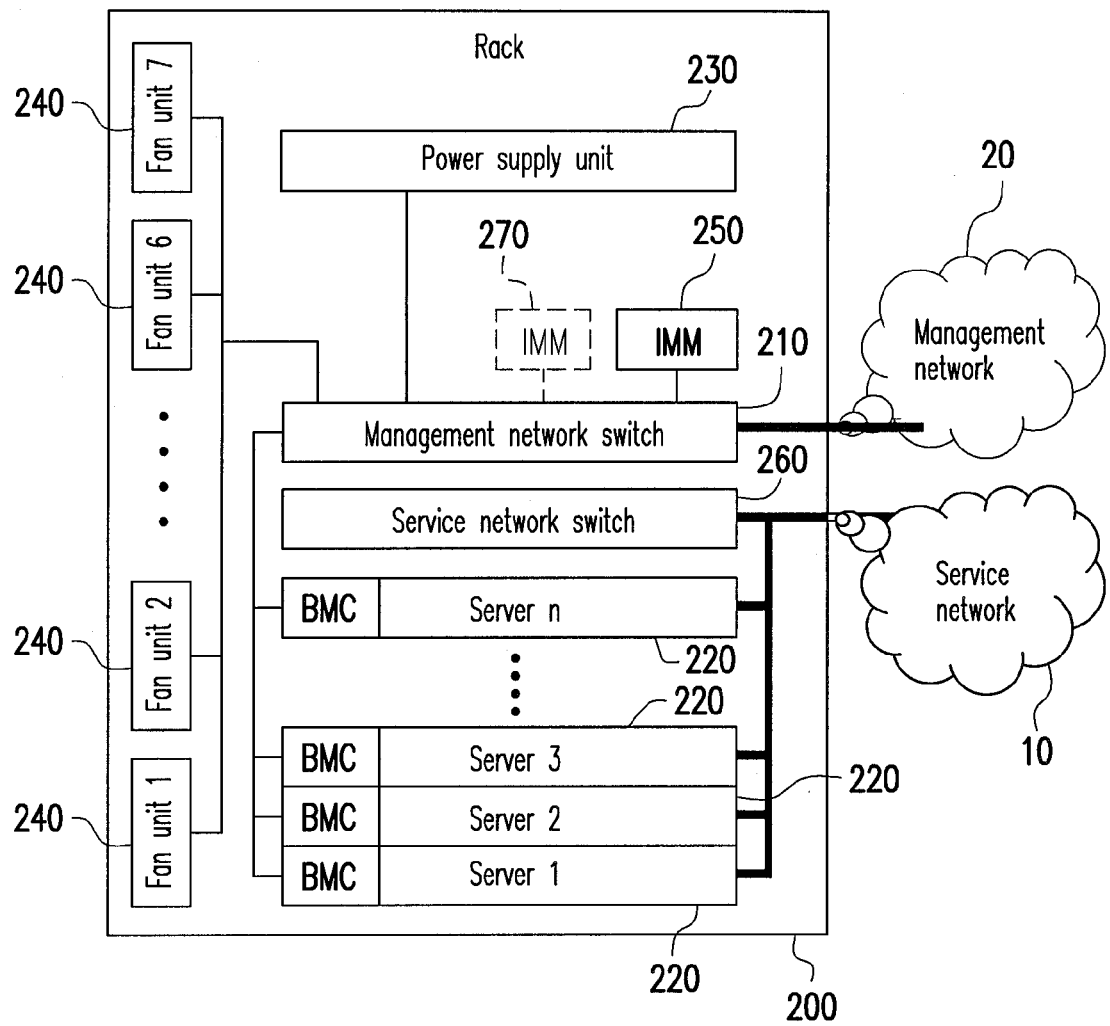
FIG. 2 is a functional block diagram illustrating a server rack system according to one embodiment of the present invention.

FIG. 2 is a functional block diagram illustrating a server rack system 200 according to one embodiment of the present invention. The server rack system 200 includes a communication module, a plurality of internal devices within the rack, and an integrated management module (IMM) 250. The internal devices within the rack are coupled to the communication module. The IMM 250 is coupled to the communication module and communicates with the internal devices through the communication module. The communication module includes a network switch 210. The network switch 210 includes a plurality of management network ports and is coupled to a management network 20. The IMM 250 and the internal devices are coupled to the management network ports of the network switch 210, respectively.

In the present embodiment, the internal devices include a plurality of servers 220, at least one power supply unit 230, a plurality of fan units 240, and a network switch 260. The internal devices are disposed at different locations in the server rack system 200 and each have a management network port. The servers 220 each further have a service network port. Network connection ports of the network switch 260 (i.e. service network switch) are connected to the service network ports of the servers 220, respectively. The servers 220 provide service to a service network 10 (e.g. internet) through the network switch 260.

The servers 220 each have a baseboard management controller (BMC), and each BMC has a management network port. The BMC is known in the server field and, therefore, is not further discussed herein. The management network port of each BMC is connected to a corresponding one of management network ports of the network switch 210. The network switch 210 (i.e. management network switch) is coupled to the management network 20. The management network 20 may be a local area network (LAN), such as, an Ethernet. The network switch 210 may be an Ethernet switch or another LAN switch.

A management network port of the IMM 250 is connected to the network switch 210. The IMM 250 communicates with the BMCs of the servers 220 through the network switch 210 to obtain operation status (e.g. internal temperatures) of the servers 220, and/or control operations (e.g. startup, shutdown and firmware update) of the servers 220.

The server rack system 200 is provided with at least one power supply unit 230. The power supply unit 230 provides power to the server rack system 200, for example, to the network switch 210, network switch 260, servers 220, fan units 240 and IMM 250. The power supply unit 230 has a management network port. The management network port of the power supply unit 230 is connected to the network switch 210. The IMM 250 can communicate with the power supply unit 230 through the network switch 210 to obtain operation status of the power supply unit 230, and/or control operations of the power supply unit 230. For example, the IMM 250 can obtain relevant power consumption information of the server rack system 200 (e.g. power consumption of all servers 220) through the network switch 210. Based on the obtained power consumption information, the IMM 250 sends out a control command through the network switch 210 to the power supply unit 230 to control/adjust a power output of the power supply unit 230.

The server rack system 200 is provided with a plurality of fan units 240, for example, seven fan units 240 as shown in FIG. 2. The fan units 240 each have a management network port. The management network ports of the fan units 240 are connected to the network switch 210. The IMM 250 can communicate with the fan units 240 through the network switch 210 to obtain operation status (e.g. fan speeds) of the fan units 240, or control operations (e.g. adjust the fan speeds) of the fan units 240. For example, the IMM 250 accesses the BMCs of the servers 220 through the network switch 210 to obtain temperatures of the servers 220. Based on the obtained temperatures of the servers 220, the IMM 250 sends out a control command through the network switch 210 to the fan units 240 to control/adjust the fan speeds of the fan units 240.

In some embodiments, the IMM 250 looks up in a fan speed control table according to the temperatures of the servers 220. The fan speed control table records a correspondence relationship between temperatures and fan speeds. As such, the IMM 250 can obtain revolutions-per-minute (RPM) of the fan units 240 from the fan speed control table. Based on the RPM of the fan units 240, the IMM 250 sends out control commands through the network switch 280 (210?) to the fan units 240 to control/adjust the fan speeds of the fan units 240.

The network switch 210 can be connected to a remote management station over the management network 20. The servers 220, power supply unit 230 and fan units 240 each have a network interface card. That is, the servers 220, power supply unit 230 and fan units 240 each have a different media access control (MAC) address and a different internet protocol (IP) address. As such, the remote management station can communicate with the IMM 250, servers 220, power supply unit 230 and/or fan units 240 through the network switch 210. Communication using MAC address or IP address is already known in the network communication field and, therefore, is not further discussed herein. Therefore, the remote management station can obtain the operation status of the power supply unit 230 and/or fan units 240 by accessing the IMM 250. Furthermore, the remote management state can directly access the power supply unit 230 and/or fan units 240 without through the IMM 250.

In the present embodiment, the internal devices (e.g. devices 220, 230, 240) are connected to the management network ports of the network switch 210 according to a preset correspondence relationship, respectively. For example, a first network port of the network switch 210 is specified to be connected to a device at a first layer of the rack and, by analogy, an eighth network port of the network switch 210 is specified to be connected to a device at an eighth layer of the rack.

The IMM 250 is pre-stored with a correspondence relationship between marker information, identification information and asset numbers of the internal devices (e.g. servers 220, power supply unit 230 and/or fan units 240). According to a correspondence relationship between the marker information of the internal devices, in-rack locations of the internal devices, and the management network ports of the network switch 210, the internal devices are connected to the management network ports, respectively. The marker information of the internal devices at least includes types and numbers, or MAC address or device numbers of the internal devices. The IMM 250 may also be pre-stored with the correspondence relationship between the marker information of the internal devices, in-rack locations of the internal devices (e.g. a rack device table), and the management network ports.

In operation of the system, the IMM 250 reads the identification information of the internal devices (e.g. devices 220, 230, 240) through the communication module (network switch 210), and obtains a correspondence relationship between the marker information and asset numbers of the internal devices from the correspondence relationship pre-stored in the IMM according to the identification information to thereby perform the asset management of the internal devices. The identification information includes serial numbers, MAC addresses or other unique identification information. If the identification information includes the serial numbers of the internal devices, the correspondence relationship is a correspondence relationship between the marker information, serial numbers and asset numbers of the internal devices. If the identification information includes the MAC addresses of the internal devices, the correspondence relationship is a correspondence relationship between the marker information, MAC addresses and asset numbers of the internal devices.

In operation of the system, the IMM 250 can send out a network command through a command line interface (CLI) to access the network switch 210 to obtain the MAC addresses of the internal devices (e.g. servers, power supply unit and/or fan units) and a correspondence relationship between the MAC addresses and the management network ports. CLI telnet provides a standard protocol tool for communication between the IMM 250 and CLI devices (e.g. switches and routers). According to a correspondence relationship between the marker information of the internal devices, in-rack locations of the internal devices, and the management network ports of the network switch 210, the IMM 250 can obtain a correspondence relationship between the marker information of the internal devices, in-rack locations of the internal devices, and the MAC addresses of the devices connected to the network switch 210.

In the present embodiment, the correspondence relationship between the marker information of the internal devices, in-rack locations of the internal devices, and the switch management network ports is present in two tables, a rack device table and a switch port device table. The rack device table records the correspondence relationship between the marker information of the internal devices and the in-rack locations of the internal devices. For example, Table 1 is the rack device table showing the in-rack locations of the internal devices, such as, the network switch 210, servers 220, power supply unit 230, fan units 240 of the server rack system 200. For example, according to the rack device table of Table 1, a seventh fan unit is disposed at a seventh layer of a rear side of the rack, occupying the height of six layers of the servers; a first server is disposed at a first layer of a front side of the rack, occupying the height of one layer.

TABLE 1

Rack Device Table

| Device Type | Device Number | Height | In-Rack Location | Device Index |
|---|---|---|---|---|
| Server | 1 | 1 | Front 1 | 1 |
| ... | ... | ... | ... | ... |
| Server | 18 | 1 | Front 18 | 18 |
| Server | 19 | 1 | Front 25 | 19 |
| ... | ... | ... | ... | ... |

TABLE 1-continued

Rack Device Table

| Device Type | Device Number | Height | In-Rack Location | Device Index |
|---|---|---|---|---|
| Server | 36 | 1 | Front 42 | 36 |
| Fan Unit | 1 | 6 | Rear 1 | 37 |
| ... | ... | ... | ... | ... |
| Fan Unit | 7 | 6 | Rear 7 | 43 |
| IMM | 1 | 1 | Front 19 | 44 |
| IMM | 2 | 1 | Front 20 | 45 |
| Service Network Switch | 1 | 1 | Front 21 | 46 |
| Management Network Switch | 1 | 1 | Front 22 | 47 |
| Power Supply Unit | 1 | 2 | Front 23 | 48 |

In addition, the switch port device table records a correspondence relationship between the marker information of the internal devices and the switch management network ports. It is assumed herein that the network switch 210 has forty-eight LAN ports and the LAN ports of the network switch 210 are connected to the internal devices, such as, the servers 220, power supply unit 230, fan units, that are disposed at corresponding locations, according to the switch port device table of Table 2. For example, according to the switch port device table, a first network port of the network switch 210 is specified to be connected to the first server (i.e. the device at the first layer of the rack) and, by analogy, a thirty-six network port of the network switch 210 is specified to be connected to a thirty-sixth server 36 (i.e. the device at a forty-second layer of the rack); a fortieth network port of the network switch 210 is specified to be connected to the IMM 250 (i.e. the device at a nineteenth layer of the rack); a forty-first network port of the network switch 210 is specified to be connected to the power supply unit 230 (i.e. the device at a twenty-third layer of the rack).

TABLE 2

Switch Port Device Table

| Port | Device Type | Device Number |
|---|---|---|
| 1 | Server | 1 |
| ... | ... | ... |
| 36 | Server | 36 |
| 39 | | |
| 40 | IMM | 1 |
| 41 | Power Supply Unit | 1 |
| 42 | Fan Unit | 1 |
| ... | ... | ... |
| 48 | Fan Unit | 7 |

As can be seen from the rack device table of Table 1 and the switch port device table of Table 2, the seventh fan unit is connected to the fortieth network port of the switch 210, and the first server is connected to the first network port of the switch 210. The IMM 250 can obtain the MAC address of the device connected to the fortieth network port of the switch 210 and the MAC address of the device connected to the first network port of the switch 210 by accessing the switch 210 through the CLI. As such, the IMM 250 can obtain static connection and in-rack location of each internal device (server 220, fan unit 240 and/or power supply unit 230) within the entire rack system 200, and obtain the MAC address of each internal device within the rack. That is, the IMM 250 is pre-stored with the correspondence relationship between the marker information of the internal devices, in-rack locations of the internal devices, and the management network ports.

In operation of the system, the IMM 250 can interactively access the network switch 210 through the CLI of the network switch 210 (e.g. serial port or Telnet) to obtain a port MAC address list (i.e. PORT_MAC list) generated by the network switch 210, and the port MAC address list has port fields and MAC address fields. That is, the IMM 250 obtains the correspondence relationship between the MAC addresses of the internal devices and the switch management network ports by accessing the network switch 210 through the CLI. For example, the IMM 250 can obtain the MAC address of the device connected to the first network port of the network switch 210 and the MAC address of the device connected to the tenth network port of the network switch 210 from the port MAC address list of the network switch 210. The IMM 250 obtains an IP address of an internal device corresponding an MAC address in the port MAC address list by parsing a communication packet according to the MAC address in the port MAC address list. Therefore, the IMM 250 can obtain the IP address of each internal device within the rack (server, power supply unit or fan unit).

As such, the IMM 250 can obtain the IP address of a device connected to a specific network port of the switch 210. For example, the IMM 250 can obtain the IP address of the seventh fan unit 240 connected to the forty-eighth network port of the switch, and the IP address of the first server 220 connected to the first network port. At this time, the IMM 250 can recognize that the seventh fan unit 240 and the first server 220 are in position. Therefore, the IMM 250 can communicate with the server 220, power supply unit 230 and/or fan unit 240 at specific in-rack locations of the rack using their corresponding IP addresses.

Notably, the IP address may be dynamically assigned by a dynamic host configuration protocol (DHCP) server after startup of the server rack system. The MAC address of each internal device is fixed and unique and, therefore, the IMM 250 can reversely parse a corresponding IP address using the MAC address. As such, using the corresponding IP address, the IMM 250 can communicate with any one of the internal devices (servers 220, fan units 240 and/or power supply unit 230) to obtain the operation status of the servers 220, fan units 240 and/or power supply unit, or control the operations of the servers 220, fan units 240 and/or power supply unit 230.

In another embodiment, the IMM 250 is pre-stored with the correspondence relationship between the marker information and asset numbers of the internal devices (e.g. servers 220, power supply unit 230 and/or fan units 240). The IMM 250 can obtain the marker information (e.g. device numbers) of the internal devices within the entire rack system 200 and obtain a correspondence relationship between the marker information of the internal devices, in-rack locations of the internal devices, and the management network ports of the network switch 210 with reference to the rack device table of Table 1 and the switch port device table of Table 2, as described in the previous embodiment. Furthermore, the correspondence relationship between the maker information of the internal devices, in-rack locations of the internal devices, and the MAC addresses can be obtained according to the correspondence relationship between the maker information of the internal devices, the in-rack locations of the internal device, and the management network ports of the network switch 210; the correspondence relationship between the marker information of the internal devices, the in-rack locations of the internal devices, and the asset numbers of the internal devices can be obtained according to the correspondence relationship between the maker information, MAC addresses, and asset numbers of the internal devices. The IMM 250 can perform the asset location and asset management to the internal devices (e.g. servers 220, power supply unit 230 and/or fan units 240) according to the correspondence relationship between the marker information of the internal devices, the in-rack locations of the internal devices, the MAC addresses and asset numbers of the internal devices.

In the above operations, when any one of the internal devices is updated/replaced, the IMM 250 first updates again the correspondence relationship between the marker information of the internal devices, the in-rack locations of the internal devices, and the management network ports according to the rack device table of Table 1 and the switch port device table of Table 2, and then accesses again the network switch 210 to update the correspondence relationship between the marker information of the internal devices, the in-rack locations of the internal devices, and the management network ports. Using the MAC address, the IMM 250 can obtain the asset number of the new internal device that corresponds to the MAC address. The IMM 250 can then automatically obtain the correspondence relationship between the marker information of the new internal device, the in-rack location of the new internal device, and the asset number of the new internal device.

The IMM 250 may further upload the correspondence relationship between the maker information of the internal device, the in-rack locations of the internal device, the MAC addresses and asset numbers of the internal devices (servers 220, power supply unit 230 and/or fan units 240) to the remote management station through the network switch 210. When any one of the internal devices is updated, the remote management station can obtain the correspondence relationship between the marker information of the new internal device, the in-rack location of the new internal device, the MAC address, IP address and asset number of the new internal device. As such, the asset number can also be timely updated. The IMM 250 can provide the in-rack location of the new device to the remote management station. The IMM 250 can also automatically upload the rack device table, or allows for timely search to facilitate users (or remote management station) tabulating statistics of the assets of multiple rack systems. Therefore, the IMM 250 can perform the asset management and asset location to the servers 220, power supply unit 230 and/or fan units 240.

An encoding rule of the asset numbers may be determined according to actual requirements. In the present embodiment, the asset numbers of the internal devices within one same server rack system have at least one same marker bit. In a server room equipped with multiple server rack systems, the same marker bit indicates a location of the server rack system in the server room.

Notably, referring to FIG. 2, a backup IMM 270 may be optionally provided in the server rack system 200, depending on the actual requirements. Management network ports of the backup IMM 270 are connected to the network switch 210. The backup IMM 270 has the same function as the IMM 250 and can perform the same operations as the IMM 250. In cases of a failure of the IMM 250, the IMM 250 can be replaced by the backup IMM 270.

In summary, in embodiments of the present invention, the IMM 250 is a management center of the entire rack system. The IMM 250 is connected with all the fan units 240, power supply unit 230 and BMCs of the servers 220 over a high speed Ethernet network (10/100M). The IMM 250 obtains the temperature of each server 220 through the BMC of the corresponding server 220 and, after calculating an optimized fan speed, sends out a command to the fan units 240 through the management network to control the fan speed. Alternatively, the IMM 250 obtains the power consumption information of each server 220 through the BMC of the corresponding server 220 to obtain a total power consumption of all the servers 220. Based on the total power consumption, the IMM 250 then sends out a command to the power supply unit 230 through the management network to optimize the power output of the power supply unit 230 thus achieving a power saving purpose. In some embodiments, two IMMs can be disposed in one rack, which enables stable management of the entire rack by using a 1+1 redundant backup. All the internal devices within the rack are full network-connected. Therefore, the server rack system 200 brings the advantages of high speed (100M Ethernet network) and easy deployment (only network connection needs to be changed). In addition, the location and management of each device is realized by using the switch, without additional hardware.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system comprising:
a communication module;
a plurality of internal devices within the rack, the internal devices coupled to the communication module; and
an integrated management module (IMM) coupled to the communication module and communicating with the internal devices through the communication module, the IMM being pre-stored with a correspondence relationship between marker information, identification information, and asset numbers of the internal devices, wherein, in operation of the system, the IMM reads the identification information of the internal devices through the communication module, and obtains a correspondence relationship between the marker information and asset numbers of the internal devices from the correspondence relationship pre-stored in the IMM according to the identification information to thereby perform asset management of the internal devices;
wherein the identification information comprises media access control (MAC) addresses of the internal devices, and the correspondence relationship pre-stored in the IMM is a correspondence relationship between the marker information, MAC addresses and asset numbers of the internal devices, the IMM and the internal devices each have a management network port; the communication module comprises a network switch coupled to a management network and having a plurality of management network ports; the IMM and the internal devices are connected to the management network ports of the network switch, respectively; and, in operation of the system, the IMM obtains the MAC addresses of the internal devices by using a network command to access the network switch, the IMM is pre-stored with a correspondence relationship between the marker information of the internal devices, in-rack locations of the internal devices and the management network ports of the network switch; in operation of the system, the IMM obtains a correspondence relationship between the MAC addresses of the internal devices and the management network ports of the network switch, the correspondence relationship being generated by the network switch, obtains a correspondence relationship between the marker information of the internal devices, the in-rack locations of the internal devices and the MAC addresses of the internal devices according to the correspondence relationship between the marker information of the internal devices, the in-rack locations of the internal devices and the management network ports of the network switch, and obtains a correspondence relationship between the marker information of the internal devices, the in-rack locations of the internal devices, and the asset numbers of the internal devices to thereby perform asset location of the internal devices according to a correspondence relationship between the marker information, MAC addresses and asset numbers of the internal devices.

2. The server rack system according to claim 1, wherein the identification information comprises serial numbers of the internal devices, and the correspondence relationship pre-stored in the IMM is a correspondence relationship between the marker information, serial numbers and asset numbers of the internal devices.

3. The server rack system according to claim 1, further comprising a remote management station connected to the IMM over the management network, wherein the IMM uploads the correspondence relationship between the marker information of the internal devices, the in-rack locations of the internal devices, and the asset numbers of the internal devices to the remote management station.

4. The server rack system according to claim 1, wherein when any one of the internal devices is updated, the IMM accesses again the network switch to update the correspondence relationship between the marker information, MAC addresses and asset numbers of the internal devices.

5. The server rack system according to claim 1, wherein the marker information of the internal devices at least comprises types and numbers of the internal devices.

6. The server rack system according to claim 1, wherein the internal devices comprise a power supply unit, a fan unit, or a server.

7. The server rack system according to claim 1, wherein the asset numbers of the internal devices within one same server rack system have at least one same marker bit indicating a location of the server rack system in a server room.

* * * * *